(12) United States Patent
Koyama et al.

(10) Patent No.: US 12,176,547 B2
(45) Date of Patent: Dec. 24, 2024

(54) CATALYST LAYER FOR POLYMER ELECTROLYTE FUEL CELLS, MEMBRANE-ELECTRODE ASSEMBLY, AND POLYMER ELECTROLYTE FUEL CELL

(71) Applicant: TOPPAN PRINTING CO., LTD., Tokyo (JP)

(72) Inventors: Hiroaki Koyama, Tokyo (JP); Madoka Ozawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 528 days.

(21) Appl. No.: 17/478,485

(22) Filed: Sep. 17, 2021

(65) Prior Publication Data
US 2022/0006099 A1    Jan. 6, 2022

Related U.S. Application Data

(63) Continuation of application No. PCT/JP2020/012754, filed on Mar. 23, 2020.

(30) Foreign Application Priority Data

Mar. 22, 2019    (JP) ................................. 2019-055655

(51) Int. Cl.
*H01M 4/86*    (2006.01)
*H01M 4/90*    (2006.01)
(Continued)

(52) U.S. Cl.
CPC ....... *H01M 4/8657* (2013.01); *H01M 4/9083* (2013.01); *H01M 8/1004* (2013.01); *H01M 8/1018* (2013.01)

(58) Field of Classification Search
CPC ............. H01M 4/8567; H01M 4/9083; H01M 8/1004; H01M 8/1018
(Continued)

(56) References Cited

U.S. PATENT DOCUMENTS

| | | | |
|---|---|---|---|
| 2006/0024562 A1* | 2/2006 | Kashino | H01M 4/8605 429/506 |
| 2006/0166074 A1 | 7/2006 | Pan et al. | |
| 2017/0014780 A1* | 1/2017 | Birss | B01J 20/3204 |
| 2021/0013524 A1 | 1/2021 | Ozawa et al. | |

FOREIGN PATENT DOCUMENTS

| | | |
|---|---|---|
| JP | 3617237 B2 | 2/2005 |
| JP | 2005-190872 A | 7/2005 |

(Continued)

OTHER PUBLICATIONS

Extended European Search Report issued in corresponding European Patent Application No. 20779726.7 dated Apr. 20, 2022 (9 pages).
(Continued)

*Primary Examiner* — James M Erwin
*Assistant Examiner* — John S Medley
(74) *Attorney, Agent, or Firm* — Foley & Lardner LLP

(57) ABSTRACT

A catalyst layer for polymer electrolyte fuel cells that improves drainage or gas diffusion, reduces or prevents the occurrence of cracking in a catalyst layer, enhances catalyst utilization efficiency, exerts high output power and high energy conversion efficiency, and has high durability, and also provides a membrane-electrode assembly and a polymer electrolyte fuel cell using the catalyst layer. The catalyst layer for polymer electrolyte fuel cells contains a catalyst, carbon particles, a polymer electrolyte, and a fibrous material. In the catalyst layer, the carbon particles carry the catalyst1. The catalyst layer for polymer electrolyte fuel cells has voids. The percentage of frequencies of the voids having a cross-sectional area of 10,000 $nm^2$ or more is 13% or more and 20% or less among the voids observed in a thickness-direction cross section of the catalyst layer for polymer electrolyte fuel cells perpendicular to the surface thereof.

11 Claims, 3 Drawing Sheets

(51) Int. Cl.
*H01M 8/1004* (2016.01)
*H01M 8/1018* (2016.01)

(58) Field of Classification Search
USPC .......................................................... 429/483
See application file for complete search history.

(56) References Cited

FOREIGN PATENT DOCUMENTS

| | | | | | |
|---|---|---|---|---|---|
| JP | 4037814 | B2 | | 1/2008 | |
| JP | 2008-052933 | A | | 3/2008 | |
| JP | 2008258057 | A | * | 10/2008 | .............. H01M 4/86 |
| JP | 2017069056 | A | * | 4/2017 | .............. Y02E 60/10 |
| WO | WO 2019/189839 | A1 | | 10/2019 | |

OTHER PUBLICATIONS

International Searching Authority, "International Search Report," issued in connection with International Patent Application No. PCT/JP2020/012754, dated Jun. 23, 2020.

International Searching Authority, "Written Opinion," issued in connection with International Patent Application No. PCT/JP2020/012754, dated Jun. 23, 2020.

Tanaka Precious Metals Group Industrial Business Global Site, "Electrocatalysts for fuel cells/water electrolysis (PEM type): Development and stable supply of catalysts for the realization of carbon neutrality", retrieved from the Internet: https://urldefense.com/v3/_https://tanaka-preciousmetals.com/jp/products/detail/pefcs/__;!!L2Ps738!xBYi59dRzC47PuwmNy0P4LZGIrtaUe8UxAxK6vaeVHIo_ErtUqzl0tfkDoloGYa4APFRRmOA-GnUiOIJqKoNOuuGKcsi$ on Apr. 8, 2024.

* cited by examiner

CATALYST LAYER FOR POLYMER ELECTROLYTE FUEL CELLS, MEMBRANE-ELECTRODE ASSEMBLY, AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/012754, filed on Mar. 23, 2020, which is based upon and claims the benefit of priority to Japanese Patent Application No. 2019-055655, filed on Mar. 22, 2019; the disclosures of which are incorporated herein by reference in their entireties.

TECHNICAL FIELD

The present invention relates to catalyst layers for polymer electrolyte fuel cells, membrane-electrode assemblies, and polymer electrolyte fuel cells.

BACKGROUND

In recent years, fuel cells have been attracting attention as an effective solution to environmental issues or energy issues. Fuel cells refer to cells that oxidize fuel such as hydrogen using an oxidant, such as oxygen, and convert chemical energy involved in the oxidization into electrical energy.

Fuel cells may be classified into alkaline, phosphoric acid, polymer, molten carbonate, and solid-oxide types, or other types depending on the kind of electrolyte. Since polymer electrolyte fuel cells (PEFCs) operate at low temperatures, have a high output power density, and can be reduced in size and weight, they are expected to be applied to portable power supplies, domestic power supplies, and vehicle-mounted power sources.

Such a polymer electrolyte fuel cell (PEFC) has a structure in which an electrolyte membrane, specifically, a polymer electrolyte membrane is sandwiched between a fuel electrode (anode) and an air electrode (cathode). A fuel gas containing hydrogen is supplied to the fuel electrode, and an oxidant gas containing oxygen is supplied to the air electrode to generate electrical power by an electrochemical reaction as follows.

Anode: $H_2 \rightarrow 2H^+ + 2e^-$  (Reaction 1)

Cathode: $\frac{1}{2}O_2 + 2H^+ + 2e^- \rightarrow H_2O$  (Reaction 2)

The anode and the cathode each have a laminated structure including a catalyst layer and a gas diffusion layer. Fuel gas supplied to the anode catalyst layer is converted to protons and electrons by an electrode catalyst (Reaction 1). The protons pass through a polymer electrolyte in the anode catalyst layer and the polymer electrolyte membrane and migrate to the cathode. The electrons pass through an external circuit and migrate to the cathode. In the cathode catalyst layer, the protons, the electrons, and the oxidant gas supplied from outside react and generate water (Reaction 2). Thus, as the electrons pass through the external circuit, electrical power is generated.

To reduce the cost of fuel cells, fuel cells exhibiting high output characteristics are desired to be produced. However, since a lot of water is generated during high output power operation, water may overflow into the catalyst layer or the gas diffusion layer, causing flooding by which gas supply is prevented. Because of this, fuel cells of the conventional art have suffered from an issue that significant output reduction is likely to occur in the fuel cells.

As measures against this issue, PTLs 1 and 2 each propose a catalyst layer containing carbon with different particle sizes or containing carbon fibers.

[Citation List] [Patent Literatures] PTL 1: JP 3617237 B; PTL 2: JP 4037814 B.

SUMMARY OF THE INVENTION

Technical Problem

According to PTL 1, the catalyst layer contains different carbon materials to form pores therein which are expected to improve drainage or gas diffusion. However, if the carbon materials are formed of only particles, another issue may be raised. That is, cracking may be easily induced in the catalyst layer and durability may be deteriorated due to the cracking.

According to PTL 2, the catalyst layer contains not only catalyst-carrying carbon but also fibrous carbon which are expected to achieve high power generation efficiency while preventing cracking in the catalyst layer. However, power generation performances of fuel cells greatly depend on the size and distribution of pores. Therefore, from the perspective of enhancing power generation performances, there is still room for improving the method that uses combinations with carbon fibers.

The present invention has been made in light of the circumstances described above and aims to provide a catalyst layer for polymer electrolyte fuel cells that improves drainage or gas diffusion, reduces or prevents the occurrence of cracking in a catalyst layer, enhances catalyst utilization efficiency, has high output power and high energy conversion efficiency, and has high durability, and also to provide a membrane-electrode assembly and a polymer electrolyte fuel cell using the catalyst layer.

Solution to Problem

As a means for solving the above issues, a catalyst layer for polymer electrolyte fuel cells according to an aspect of the present invention is a catalyst layer for polymer electrolyte fuel cells, the catalyst layer containing a catalyst, carbon particles, a polymer electrolyte, and a fibrous material, the carbon particles carrying the catalyst.

The catalyst layer for polymer electrolyte fuel cells includes voids.

The percentage of frequencies of voids having a cross-sectional area of 10,000 nm² or more is 13% or more and 20% or less among the voids observed in a thickness-direction cross section of the catalyst layer perpendicular to the surface thereof.

In the catalyst layer for polymer electrolyte fuel cells, the maximum value of the cross-sectional areas of the voids is preferred to be 70,000 nm² or more and 100,000 nm² or less.

In the catalyst layer for polymer electrolyte fuel cells, the percentage of a total cross-sectional area of the voids having a cross-sectional area of 10,000 nm² or more among the voids with respect to a total cross-sectional area of all the voids is preferred to be 40% or more and 50% or less.

In the catalyst layer for polymer electrolyte fuel cells, the catalyst layer is preferred to be configured to have an average thickness in the range of 1 µm or more and 30 µm or less in a direction perpendicular to the surface of the catalyst layer.

A membrane-electrode assembly according to another aspect of the present invention includes a polymer electrolyte membrane having surfaces respectively provided with an anode catalyst layer and a cathode catalyst layer.

The anode catalyst layer and the cathode catalyst layer are each provided with a frame-shaped gasket.

At least one of the anode catalyst layer and the cathode catalyst layer is the catalyst layer for polymer electrolyte fuel cells described above.

A polymer electrolyte fuel cell according to another aspect of the preset invention includes the catalyst layer for polymer electrolyte fuel cells or the membrane-electrode assembly described above.

Advantageous Effects of the Invention

According to an aspect of the present invention, there can be provided a catalyst layer for polymer electrolyte fuel cells that improves drainage or gas diffusion, reduces or prevents the occurrence of cracking in the catalyst layer, enhances catalyst utilization efficiency, has high output power and high energy conversion efficiency, and has high durability, and there can also be provided a membrane-electrode assembly and a polymer electrolyte fuel cell using the catalyst layer. More specifically, according to an aspect of the present invention, there can be provided a catalyst layer for polymer electrolyte fuel cells which achieves high output power by improving gas diffusion and which is capable of maintaining good performance for a longer period of time by achieving high drainage, and there can also be provided a membrane-electrode assembly and a polymer electrolyte fuel cell using the catalyst layer.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

First, a polymer electrolyte fuel cell will be described, which uses a catalyst layer for polymer electrolyte fuel cells (which may also be termed a catalyst layer hereinafter) and a membrane-electrode assembly to which an embodiment of the present invention can be applied.

(General Configuration of Polymer Electrolyte Fuel Cell)

Figure 5:
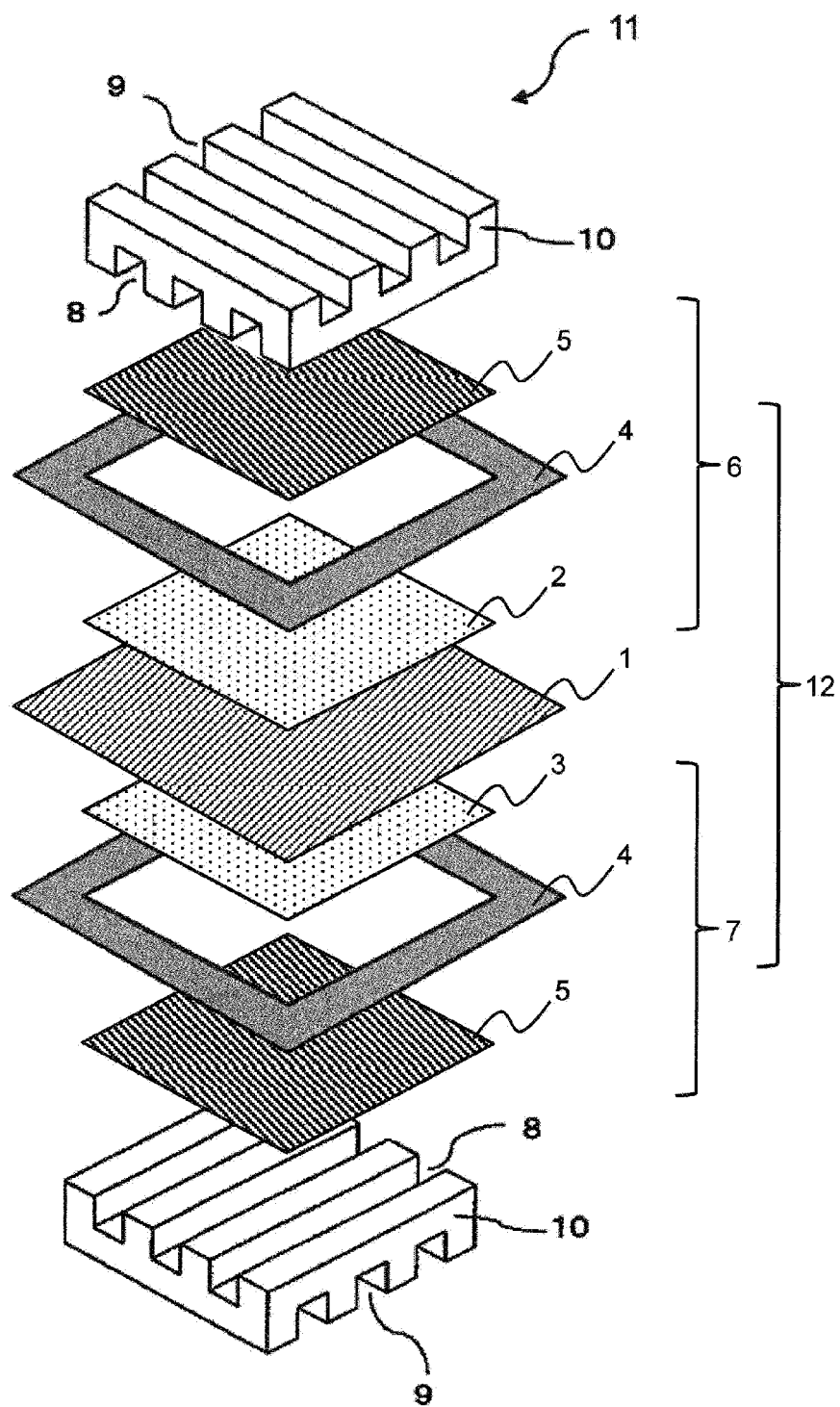
FIG. 5 is a schematic diagram illustrating a configuration example of a polymer electrolyte fuel cell, according to an embodiment of the present invention.

FIG. 5 is a schematic diagram illustrating a polymer electrolyte fuel cell 11, according to an embodiment of the present invention. As shown in FIG. 5, the polymer electrolyte fuel cell 11 of the present embodiment is provided with a membrane-electrode assembly 12 which includes a polymer electrolyte membrane 1 having opposing surfaces respectively provided with an anode catalyst layer 2 and a cathode catalyst layer 3. The anode catalyst layer 2 and the cathode catalyst layer 3 each have an outer periphery provided with a frame-shaped gasket 4. Facing the anode catalyst layer 2 and the cathode catalyst layer 3, respective gas diffusion layers 5 are disposed to compose an anode 6 and a cathode 7. There are also provided separators 10 made of a material having electrical conductivity and impermeability. Each separator 10 has a surface in which gas channels 8 are formed for passing gas therethrough, and another surface facing this surface in which cooling water channels 9 are formed for passing cooling water therethrough. As shown in FIG. 5, the separators 10 are disposed to be adjacent to the respective gas diffusion layers 5 and to sandwich the membrane-electrode assembly 12 therebetween.

A fuel gas is supplied from the gas channels 8 of the separator 10 on the anode 6 side. The fuel gas may be, for example, hydrogen gas. An oxidant gas is supplied from the gas channels 8 of the separator 10 on the cathode 7 side. As the oxidant gas, a gas such as air, for example, containing oxygen is supplied.

As shown in FIG. 5, the polymer electrolyte fuel cell 11 of the present embodiment has a cell unit structure in which a polymer electrolyte membrane 1, an anode catalyst layer 2, a cathode catalyst layer 3, gaskets 4, and gas diffusion layers 5 are sandwiched between two separators 10. However, the present embodiment may adopt a stacked structure in which a plurality of cells are connected in series via separators 10.

(Configuration of Catalyst Layer for Polymer Electrolyte Fuel Cells)

Figure 1:
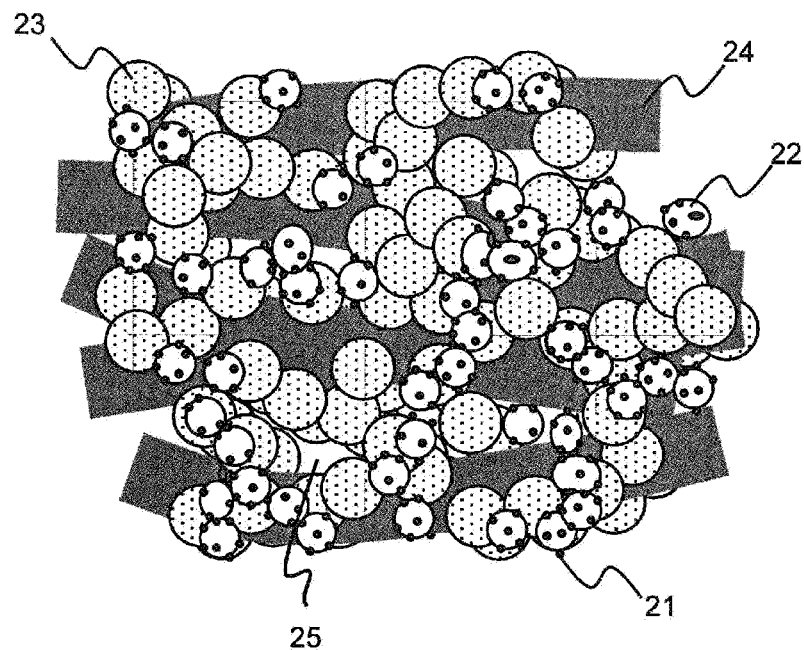
FIG. 1 is a cross-sectional view illustrating a structural example of a catalyst layer for polymer electrolyte fuel cells, according to an embodiment of the present invention.

As shown in FIG. 1, a catalyst layer (the anode catalyst layer 2 or the cathode catalyst layer 3) for polymer electrolyte fuel cells according to an embodiment of the present invention (termed the present embodiment hereinafter) contains a catalyst 21, carbon particles 22, a polymer electrolyte 23, and a fibrous material 24.

The number, distribution, size, and the like of pores in the catalyst layer of the present embodiment can be varied depending on the types or the mixing ratio of the above materials, liquid preparation method, coating method, and the like. With this variation, linkage of pores, that is, formation of voids 25, can be controlled.

(Method of Calculating Void Cross-Sectional Area)

Continuous slice images captured using a FIB-SEM device are reconstructed to obtain a three-dimensional structure of a catalyst layer. Voids 25 are extracted from the three-dimensional structure to obtain an extracted three-dimensional image of the voids 25.

Figure 2:
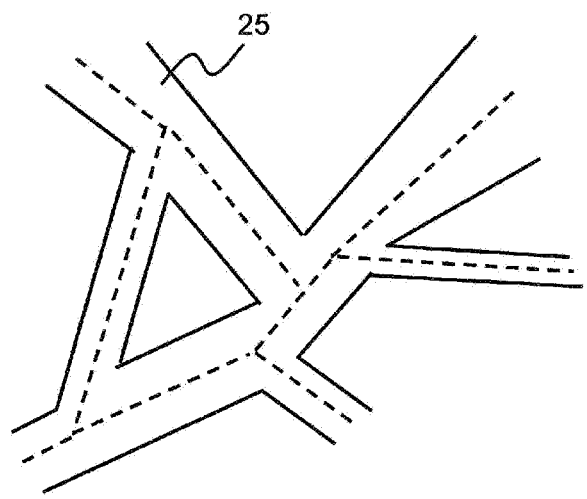
FIG. 2 is a schematic diagram illustrating an example of one-dimensional framework element of voids, according to an embodiment of the present invention.

Next, as shown in FIG. 2, a voids' framework passing through the center in the extracted three-dimensional image of the voids 25 (as indicated by the broken lines in FIG. 2) is extracted. Using the distance from the surface of the extracted three-dimensional image of the voids 25 to the voids' framework, each void cross-sectional area can be calculated. By calculating void cross-sectional areas (cross-sectional areas of the voids) for each one-dimensional framework element composing the voids' framework, a distribution of the void cross-sectional areas can be obtained. Specifically, in the present embodiment, void cross-sectional areas, which are cross-sectional areas of the voids 25, are calculated for each slice image captured by a FIB-SEM device to obtain a distribution of the void cross-sectional areas.

Reaction sites in a catalyst layer may increase or decrease according to the size of the void cross-sectional areas or the number of the one-dimensional framework elements. As a result of the increase or decrease of reaction sites, the output of the polymer electrolyte fuel cell can be improved.

By drawing a frequency distribution of the void cross-sectional areas in a catalyst layer, the structure of the catalyst layer can be quantified.

Generally, graphs in which constant ranges or class intervals appear on the horizontal axis and frequency values appear on the vertical axis are called histograms. Histograms may be drawn using scatter plots, or column charts or line charts that use approximate lines smoothly connecting the plots, or using other charts. In the present embodiment, these plots and charts are collectively termed histograms.

Hereinafter, materials forming the catalyst layer for polymer electrolyte fuel cells will be described.

(Fibrous Material)

The fibrous material 24 may have a fiber length of, for example, 0.1 μm or more and 200 μm or less, preferably 0.5 μm or more and 100 μm or less, and more preferably 1 μm or more and 50 μm or less. When the fiber length is in the above range, the strength of the catalyst layer can be enhanced and the occurrence of cracking can be minimized during formation. Also, the length of the pores in the catalyst layer can be increased and high output power can be achieved.

The fuel gas and the oxidant gas can be continuously supplied in the polymer electrolyte fuel cell 11. Therefore, as mentioned above, reaction sites can be increased by passing the gas over a wide area in the catalyst layer.

Compared to the catalyst layer containing no fibrous material 24, the catalyst layer containing the fibrous material 24 has numerous pores and, in particular, has long pores passing through the catalyst layer. Therefore, mobility of the gas in the catalyst layer is ensured, as a result of which output is improved.

Similarly, the fibrous material 24 contained in the catalyst layer contributes to reducing flooding (water clogging) in which water produced in the membrane-electrode assembly 12 is not sufficiently drained and power generation efficiency is reduced.

Compared to the catalyst layer containing no fibrous material 24, the catalyst layer containing the fibrous material 24 has numerous pores and, in particular, has long pores passing through the catalyst layer. Therefore, drainage in the catalyst layer is ensured, as a result of which efficiency of the polymer electrolyte fuel cell 11 is prevented from being reduced.

Under low-humidity operation conditions, power generation performance tends to be lowered due to drying on the anode side (drying-out phenomenon). Therefore, high-humidity operation is performed by increasing water contained in the supply gas on the cathode side. However, high-humidity operation may induce flooding mentioned above and therefore drainage in the catalyst layer is required to be improved.

Even when a catalyst layer is formed of only a catalyst 21, carbon particles 22, and a polymer electrolyte 23, pores can be increased by reducing the ratio of the polymer electrolyte 23 or using other methods. However, this is not preferred because severe cracking may be induced, making it difficult, for example, to form a catalyst layer.

In this regard, use of the fibrous material 24 can increase the structural strength of the catalyst layer and can reduce or prevent the occurrence of cracking even when there are numerous pores in the catalyst layer.

The fibrous material 24 may be electrically conductive fibers or electrolyte fibers. The electrically conductive fibers may be, for example, carbon fibers, carbon nanotubes, carbon nanohorns, electrically conductive polymer nanofibers, or the like. In particular, carbon nanofibers or carbon nanotubes are preferred from the perspective of electrical conductivity or dispersion. The electrolyte fibers may be obtained by processing a polymer electrolyte into a fibrous form. Use of the electrolyte fibers as the fibrous material 24 can improve proton conductivity. Furthermore, these fibrous materials 24 may be used singly or in combination of two or more, or electrically conductive fibers may be combined with electrolyte fibers.

The fibrous material 24 may have a fiber diameter (average fiber diameter) in the range of, for example, 0.5 nm or more and 500 nm or less, preferably 5 nm or more and 400 nm or less, and more preferably 10 nm or more and 300 nm or less. A diameter in the above range may increase the number of pores in the catalyst layer and may achieve high output performance.

(Catalyst)

Examples of the catalyst 21 may include platinum group elements such as platinum, palladium, ruthenium, iridium, rhodium, and osmium; metals such as iron, lead, copper, chromium, cobalt, nickel, manganese, vanadium, molybdenum, gallium, and aluminum; and alloys, oxides, or composite oxides of these materials. Of these materials, platinum or a platinum alloy is preferred. The catalyst 21 is preferred to have a particle size (average particle size D50) in the range of 0.5 nm or more and 20 nm or less. This is because an excessively large particle size may reduce the catalyst 21 activity, and an excessively small particle size may reduce the catalyst 21 stability. The catalyst 21 is more preferred to have a particle size (average particle size D50) in the range of 1 nm or more and 5 nm or less. The particle size of the catalyst 21 can be measured while observing by, for example, a transmission electron microscope (TEM), or can be measured using a small-angle X-ray scattering technique.
(Carbon Particles)

Any carbon particles may be used as the carbon particles 22 as long as they are microparticles and electrically conductive, and are not affected by the catalyst 21. Examples of the carbon particles 22 may include carbon black (acetylene black, furness black, Ketjen black, etc.), graphite, black lead, activated carbon, and fullerenes.

If the carbon particles 22 have an excessively small size (average particle size D50), electron conduction paths are less likely to be formed, or if they have an excessively large size, the thickness of the catalyst layer may increase, which may lead to increasing resistance and accordingly may lead to deteriorating the output characteristics. Therefore, the carbon particles 22 are preferred to have a size (average particle size D50) in the range of 10 nm or more and 1,000 nm or less. The carbon particles 22 are more preferred to have a size (average particle size D50) in the range of 10 nm or more and 100 nm or less. The size of the carbon particles 22 can be measured while observing by, for example, a scanning electron microscope (SEM) or a transmission electron microscope (TEM), or can be measured using a particle size distribution measurement technique.

When the carbon particles 22 having a high surface area support the catalyst 21, the catalyst 21 can be supported with high density and the catalytic activity can be improved. The surface area of the carbon particles 22 may be obtained using, for example, BET adsorption measurement.
(Polymer Electrolyte)

The polymer electrolyte 23 is not particularly limited as long as it is a resin component having proton conductivity. Of such materials, a fluorine polymer electrolyte or hydrocarbon polymer electrolyte is preferred to be used.

The fluorine polymer electrolyte may be, for example, Nafion (trademark) or the like manufactured by Du Pont.

As the hydrocarbon polymer electrolyte, for example, an electrolyte such as of sulfonated polyether ketone, sulfonated polyether sulfone, sulfonated polyether ether sulfone, sulfonated polysulfide, or sulfonated polyphenylene may be used.

From the perspective of adhesion between the catalyst layer and the polymer electrolyte membrane 1, a material of the same type as that of the polymer electrolyte membrane 1 is preferred to be selected as the polymer electrolyte 23.

The polymer electrolyte membrane 1 may have an average thickness in the range of, for example, 1 μm or more and 500 μm or less, preferably 3 μm or more and 200 μm or less, and more preferably 5 μm or more and 100 μm or less.

The catalyst layer may have a single-layer structure or may have a multilayer structure.

If the catalyst layer has a multilayer structure, the number of layers is preferred to be four at most to prevent extreme deterioration of power generation performance due to interface resistance. These layers may all have the same thickness or may have thicknesses different from each other.

If the catalyst layer has a multilayer structure, the composition of the catalyst 21, the carbon particles 22, the polymer electrolyte 23, the fibrous material 24, a solvent, and the like may be the same between the layers or may be different between the layers.

If the catalyst layer has a multilayer structure, the boundary surfaces of the layers may be flat or may include curved surfaces.
(Method of Producing Catalyst Layer)

The catalyst layer (the anode catalyst layer 2 or the cathode catalyst layer 3) for polymer electrolyte fuel cells can be produced by preparing a slurry for the catalyst layer, applying the slurry to a substrate or a gas diffusion layer, followed by drying, and heat-pressing the catalyst layer against the polymer electrolyte membrane 1.

The catalyst-layer slurry includes a catalyst 21, carbon particles 22, a polymer electrolyte 23, a fibrous material 24, and a solvent. Any solvent may be used for the catalyst-layer slurry as long as the polymer electrolyte 23 and the catalyst 21 can be dissolved or dispersed in the solvent.

Examples of the solvent used for the catalyst-layer slurry may include water, alcohols (methanol, ethanol, 1-propanol, 2-propanol, 1-butanol, 2-butanol, 3-butanol, pentanol, ethylene glycol, diacetone alcohol, 1-methoxy-2-propanol, etc.), ketones (acetone, methyl ethyl ketone, pentanone, methyl isobutyl ketone, diisobutyl ketone, etc.), ethers (dioxane, tetrahydrofuran, etc.), sulfoxides (dimethyl sulfoxide, etc.), and amides (dimethylformamide, dimethylacetamide, etc.). These materials may be used singly or in combination of two or more.

The solvent used for the catalyst-layer slurry is preferred to be one which is easily removed by heating, and is particularly preferred to be a slurry which has a boiling point of 150° C. or less.

The catalyst-layer slurry is preferred to contain a solute (electrically conductive particles such as the carbon particles 22, catalyst particles such as of the catalyst 21, and polymer electrolyte 23) having a concentration in the range of, for example, 1 mass % or more and 80 mass % or less, preferably 5 mass % or more and 60 mass % or less, and more preferably 10 mass % or more and 40 mass % or less.

The polymer electrolyte 23 used for the catalyst-layer slurry is not particularly limited as long as it is a resin component having proton conductivity. Of such materials, a fluorine polymer electrolyte or hydrocarbon polymer electrolyte is preferred to be used.

The fluorine polymer electrolyte may be, for example, Nafion (trademark) or the like manufactured by Du Pont.

As the hydrocarbon polymer electrolyte, for example, an electrolyte such as of sulfonated polyether ketone, sulfonated polyether sulfone, sulfonated polyether ether sulfone, sulfonated polysulfide, or sulfonated polyphenylene may be used.

The catalyst-layer slurry may be prepared by mixing the catalyst 21, the carbon particles 22, the polymer electrolyte 23, the fibrous material 24, and a solvent mentioned above, followed by dispersion treatment. The dispersion method may be, for example, a method using a ball mill, bead mill, roll mill, shear mill, wet mill, ultrasonic dispersion, homogenizer, or the like.

The catalyst-layer slurry described above can be applied to a substrate using commonly used coating methods.

Specific coating methods may include, for example, roll coating, air knife coating, blade coating, rod coating, reverse coating, bar coating, comma coating, die coating, gravure coating, screen coating, spray coating, and spin coating.

Coating methods are not particularly limited as long as the same catalyst ink (catalyst-layer slurry) can be finally applied to a substrate.

The catalyst-layer slurry is applied to a substrate and heated to volatilize the solvent in the catalyst-layer slurry, thereby obtaining a desired catalyst layer.

The method of drying the catalyst-layer slurry may be, for example, hot-air drying, R drying, or the like. The drying temperature may be 40° C. to 200° C., and preferably around 40° C. to 120° C. The drying time may be 0.5 minutes to 1 hour, and preferably around 1 minute to 30 minutes.

In the drying process, a single drying mechanism may be used or a plurality of drying mechanisms may be used in combination.

The catalyst layer obtained by drying the catalyst-layer slurry may have an average thickness in the range of, for example, 0.1 μm or more and 100 μm or less, preferably 0.5 μm or more and 50 μm or less, more preferably 1 μm or more and 30 μm or less, and even more preferably 1 μm or more and 20 μm or less. If the catalyst layer has a thickness of 30 μm or less, the occurrence of cracking can be minimized. Use of catalyst layers in the polymer electrolyte fuel cell 11 can prevent lowering of diffusion of gas or produced water or lowering of electrical conductivity and, furthermore, lowering of output of the polymer electrolyte fuel cell 11. If the thickness of the catalyst layer is 1 μm or more, the thickness of the catalyst layer is less likely to vary, and the catalytic materials, such as the catalyst 21, and the polymer electrolyte 23 contained in the catalyst layer may be prevented from being non-uniformly distributed. Cracking on the surfaces of the catalyst layer and uneven thickness of the catalyst layer are unfavorable because they are very likely to adversely affect durability of the polymer electrolyte fuel cell 11 when the catalyst layer is used as a part thereof and when the polymer electrolyte fuel cell 11 is operated for a long period of time.

The thickness of the catalyst layer can be measured, for example, while observing a cross section of the catalyst layer using a scanning electron microscope (SEM). A cross section of the catalyst layer can be exposed using such a method as ion milling or using an ultramicrotome. When exposing a cross section of the catalyst layer, the catalyst layer is preferred to be cooled. This may reduce damage to the polymer electrolyte 23 contained in the catalyst layer.

Any substrate may be used for transfer as long as the catalyst-layer slurry can be applied to at least one surface of the substrate, a catalyst layer can be formed on the surface by heating, and the catalyst layer as formed can be transferred to the polymer electrolyte membrane 1.

As substrates used for transfer, there may be used, for example, polymer films such as of polyethylene terephthalate, polyamide, polyimide, polystyrene, polysulfone, polyethersulfone, polyphenylene sulfide, polyetheretherketone, polyetherimide, polybenzimidazole, polyamideimide, polyacrylate, polyethylene naphthalate, and polyparabanic acid aramid; or heat resistant fluororesin films such as of polytetrafluoroethylene, polychlorotrifluoroethylene, polyvinylidene fluoride, ethylene-tetrafluoroethylene copolymer, tetrafluoroethylene-hexafluoropropylene copolymer, and tetrafluoro-perfluoroalkyl vinyl ether copolymer.

Such a substrate may be one subjected to a release treatment, or may be one having a multilayer structure integrating a release layer by coextrusion or the like.

Such a substrate may be provided with a sheet, film, plate or foil, or include at least one of them by adhesion or bonding, as long as it can be used as a substrate.

If the substrate has a multilayer structure, the outermost layer may have an opening. The opening herein refers to a portion from which a part of the layer has been removed by cutting, punching or the like means.

The shape of the catalyst ink (i.e., the electrode) after being dried may depend on the shape of the opening.

(Method of Producing Membrane-Electrode Assembly)

The method of producing a membrane-electrode assembly 12 may include forming catalyst layers (the anode catalyst layer 2 and the cathode catalyst layer 3) on the respective transfer substrates or gas diffusion layers 5, and heat-pressing the catalyst layers onto a polymer electrolyte membrane 1, or may include forming catalyst layers directly on a polymer electrolyte membrane 1. The method of directly forming catalyst layers on a polymer electrolyte membrane 1 is preferred because high adhesion is achieved between the polymer electrolyte membrane 1 and the catalyst layers, and the catalyst layers are unlikely to be damaged.

Materials used for the gaskets 4 are not particularly limited as long as an adhesive material can be applied or bonded to one surface of a gasket material, and the gasket material can be bonded to the polymer electrolyte membrane 1.

As materials used for the gaskets 4, there may be used, for example, polymer films such as of polyethylene terephthalate, polyamide, polyimide, polystyrene, polysulfone, polyethersulfone, polyphenylene sulfide, polyetheretherketone, polyetherimide, polybenzimidazole, polyamideimide, polyacrylate, polyethylene naphthalate, and polyparabanic acid aramid; or heat resistant fluororesin films such as of polytetrafluoroethylene, polychlorotrifluoroethylene, polyvinylidene fluoride, ethylene-tetrafluoroethylene copolymer, tetrafluoroethylene-hexafluoropropylene copolymer, and tetrafluoro-perfluoroalkyl vinyl ether copolymer.

Such a gasket material may be one subjected to a release treatment, or may be one having a multilayer structure integrating a release layer by coextrusion or the like.

Such a gasket material may be a sheet, film, plate or foil, or may include at least one of them by adhesion or bonding, as long as it can be used as a gasket material.

The gaskets 4 may each have an average thickness in the range of, for example, 1 μm or more and 500 μm or less, preferably 3 μm or more and 200 μm or less, and more preferably 5 μm or more and 100 μm or less.

The membrane-electrode assembly 12 prepared as described above including the catalyst layers (the anode catalyst layer 2 and the cathode catalyst layer 3) contain voids 25 in the catalyst layers. The percentage of frequencies of a void cross-sectional area of 10,000 $nm^2$ or more is 13% or more and 20% or less among the voids 25 observed in a thickness-direction cross section of each catalyst layer perpendicular to the surface thereof. Such a membrane-electrode assembly 12 can have high power generation performance and minimize the occurrence of flooding. A cell unit or a polymer electrolyte fuel cell prepared using this membrane-electrode assembly 12 can have high power generation performance over a wider range of humidity levels compared to the conventional art. The expression "the percentage of frequencies of a void cross-sectional area of 10,000 $nm^2$ or more" refers to the percentage of the voids 25 having a cross-sectional area of 10,000 $nm^2$ or more in the frequency distribution of the cross-sectional areas of the voids 25 observed in a thickness-direction cross section of the catalyst layer perpendicular to the surface thereof.

When a histogram is illustrated for the membrane-electrode assembly 12 prepared as described above, in which the horizontal axis representing the cross-sectional areas of the voids 25 (void portions) of the catalyst layer is divided into a series of 2,500-$nm^2$ intervals, the percentage of frequencies of a void cross-sectional area of 10,000 $nm^2$ or more may be 13% or more and 20% or less. Such a configuration can ensure high power generation performance and reduction or prevention of flooding, and a cell unit or a polymer electrolyte fuel cell prepared using this configuration can exert high power generation performance over a wider range of humidity levels compared to the conventional art.

In the membrane-electrode assembly 12 prepared as described above, the percentage of frequencies of the voids 25 having a void cross-sectional area of 10,000 nm² or more may be 13% or more and 20% or less among the voids 25 observed in a thickness-direction cross section of the catalyst layer perpendicular to the surface thereof. Such a configuration can ensure high power generation performance and reduction or prevention of flooding, and a cell unit or a polymer electrolyte fuel cell prepared using this configuration can exert high power generation performance over a wider range of humidity levels compared to the conventional art.

EXAMPLES

The following description explains membrane-electrode assemblies 12 according to some examples of the present invention and membrane-electrode assemblies 12 according to some comparative examples.

Example 1

In Example 1, a platinum-carrying carbon catalyst (TEC10E50E manufactured by Tanaka Kikinzoku Kogyo), water, 1-propanol, a polymer electrolyte (Nafion (trademark) dispersion manufactured by Wako Pure Chemicals Industries Ltd.), and a vapor-grown fibrous material (VGCF (trademark) manufactured by Showa Denko K.K.) were mixed and the mixture was subjected to dispersion treatment at 500 rpm for 30 minutes using a planetary ball mill to prepare a catalyst ink. In this case, zirconia balls having a diameter of 5 mm were added to about one third of the zirconia container. The catalyst ink was prepared so that the mass of the polymer electrolyte was 100 mass % with respect to the total mass of the carbon particles and the fibrous material, the mass of the fibrous material was 100 mass % with respect to the mass of the carbon particles, and the solid content concentration was 10%.

The prepared catalyst ink was applied to one surface of a polymer electrolyte membrane (Nafion 211 (trademark) manufactured by Dupont) using a slit die coater to form a coating film having a thickness of 150 μm. Next, the polymer electrolyte membrane provided with the coating film was placed in a hot air oven heated to 80° C. and dried until the tackiness of the coating film disappeared to form a cathode electrocatalyst layer. Next, the catalyst ink was applied to the other surface of the polymer electrolyte membrane using a slit die coater to form a coating film having a thickness of 50 μm. Next, the polymer electrolyte membrane provided with the coating film was placed in a hot air oven heated to 80° C. and dried until the tackiness of the coating film disappeared to form an anode electrocatalyst layer. In this way, a membrane-electrode assembly of Example 1 was obtained.

Example 2

A membrane electrode assembly of Example 2 was obtained as in Example 1, except that multiwall carbon nanotubes (60 nm to 100 nm in diameter with a length>5 μm manufactured by Tokyo Chemical Industry Co., Ltd.) were used in place of the carbon nanofibers (VGCF (trademark)-H manufactured by Showa Denko K.K.) when preparing the catalyst ink.

Example 3

A membrane electrode assembly of Example 3 was obtained as in Example 1, except that the amount of the carbon nanofibers was reduced to ½ of Example 1 when preparing the catalyst ink.

Example 4

A membrane electrode assembly of Example 4 was obtained as in Example 1, except that the amount of the polymer electrolyte was reduce to ½ of Example 1 when preparing the catalyst ink.

Example 5

A catalyst ink was prepared as in Example 1. The catalyst ink was applied to a surface of a PTFE film using a slit die coater to form a coating film having a thickness of 150 μm. Next, the polymer electrolyte membrane provided with the coating film was placed in a hot air oven heated to 80° C. and dried until the tackiness of the coating film disappeared to obtain a transfer substrate having a cathode electrocatalyst layer. Next, the catalyst ink was applied to a surface of another PTFE film using a slit die coater to form a coating film having a thickness of 50 μm. Next, the polymer electrolyte membrane provided with the coating film was placed in a hot air oven heated to 80° C. and dried until the tackiness of the coating film disappeared to obtain a transfer substrate having an anode electrocatalyst layer.

The transfer substrate having the cathode electrocatalyst layer and the transfer substrate having the anode electrocatalyst layer were respectively disposed on two opposing surfaces of a polymer electrolyte membrane (Nafion (trademark) 211 manufactured by Dupont) to form a laminate. The laminate was hot-pressed at 120° C. and 1 MPa to bond the two electrocatalyst layers to the polymer electrolyte membrane. Then, the PTFE films were separated from the respective electrocatalyst layers to obtain a membrane-electrode assembly of Example 5.

Comparative Example 1

A membrane-electrode assembly of Comparative Example 1 was obtained as in Example 1, except that no vapor-grown fibrous material was added.

Comparative Example 2

A membrane-electrode assembly of Comparative Example 2 was obtained as in Example 1, except that the amount of the vapor-grown fibrous material was reduced to ¹⁄₁₀ of Example 1 when preparing the catalyst ink.

Comparative Example 3

A membrane-electrode assembly of Comparative Example 3 was obtained as in Example 1, except that the amount of the vapor-grown fibrous material was increased to 3 times that of Example 1 when preparing the catalyst ink.

Polymer electrolyte fuel cells respectively including the membrane-electrode assemblies of Example 1 and Comparative Example 1 were measured in terms of power generation performance, the results of which are as follows.

[Measurements of Power Generation Performance]

Power generation performance was measured using a method according to a booklet titled "Cell unit evaluation and analysis protocol" and published by the New Energy and Industrial Technology Development Organization (NEDO). A JARI standard cell was used as a cell unit for evaluation, in which a gas diffusion layer, a gasket, and a separator were disposed on each surface of a membrane-electrode assembly and pressed against the surface to achieve a predetermined surface pressure. Then, I-V measurements were performed according to the method described in the booklet "Cell unit evaluation and analysis protocol". These conditions were defined to be standard conditions. Also, I-V measurements were performed with the relative humidities of the anode and cathode both being set to RH 100%. These conditions were defined to be high humidity conditions.

[Measurements of Durability]

For measuring durability, the same cell unit as in the measurements of power generation performance was used as a cell unit for evaluation. Durability was measured by conducting the humidity cycle test described in the booklet "Cell unit evaluation and analysis protocol" mentioned above.

[Measurements of Void Cross-Sectional Area)

For each of the cathode catalyst layers of the examples and the comparative examples, 200 slice images were captured in a 3.9 μm×3.9 μm×4.4 μm region using a FIB-SEM device. The slice images were reconstructed to a three-dimensional image and voids were extracted from the reconstructed three-dimensional image to obtain an extracted three-dimensional image of the voids. Next, each void cross-sectional area for each one-dimensional framework element in the region was calculated from the number of pixels from the surface of the extracted three-dimensional image of the void to the center of the void's framework.

Figure 3:
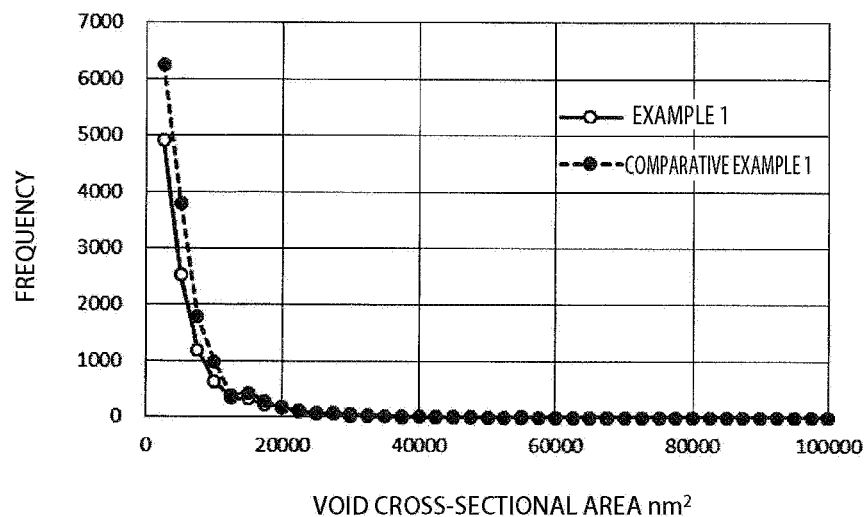
FIG. 3 is a graph illustrating percentage of frequencies of void cross-sectional areas, according to an embodiment of the present invention.
Figure 4:
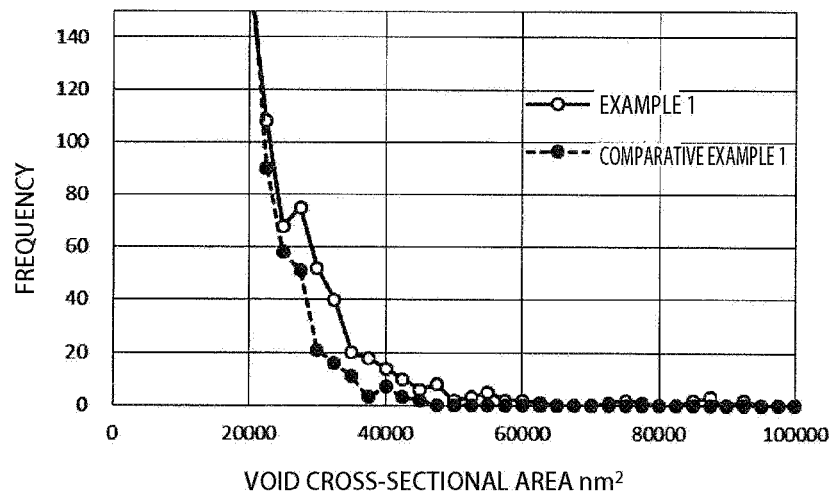
FIG. 4 is the graph shown in FIG. 3 with an enlarged frequency axis, according to an embodiment of the present invention.

Next, a histogram was drawn with the void cross-sectional area axis divided into a series of 2,500-nm² intervals. FIGS. 3 and 4 show a histogram in which void cross-sectional areas appear on the horizontal axis and frequency values appear on the vertical axis.

[Measurements of Thickness of Electrocatalyst Layer]

A cross section of each membrane-electrode assembly was observed using a scanning electron microscope (SEM) to measure the thicknesses of the membrane-electrode assembly, the cathode electrocatalyst layer, the anode electrocatalyst layer, and the polymer electrolyte membrane. Specifically, a cross section of the membrane-electrode assembly was observed at 1,000 times magnification using a scanning electron microscope (FE-SEM S-4800 manufactured by Hitachi High-Technologies, Ltd.). The thicknesses of the electrocatalyst layers were measured at 30 observation points of the cross section. The average thickness at the 30 observation points was defined to be the thickness of each layer.

Table 1 shows the percentage of frequencies of voids having a cross-sectional area (void cross-sectional area) of 10,000 nm² or more, the maximum value of the cross-sectional areas of voids, the percentage of the total cross-sectional area of voids having a cross-sectional area of 10,000 nm² or more with respect to the total void cross-sectional area (total cross-sectional area of voids), and the average thickness of the cathode catalyst layer, and evaluations of power generation performance and durability.

For power generation performance under standard conditions, cell units having a current of 25 A or more at a voltage of 0.6 V were evaluated as good, and cell units having a current of less than 25 A at a voltage of 0.6 V were evaluated as poor. Under high humidity conditions, cell units having a current of 30 A or more at a voltage of 0.6V were evaluated as good, and cell units having a current of less than 30 A at a voltage of 0.6 V were evaluated as poor.

For durability, cell units having a hydrogen cross leak current of less than 10 times the initial value after the lapse of 8,000 cycles were evaluated as good, and cell units having a hydrogen cross leak current of 10 times or more the initial value after the lapse of 8,000 cycles were evaluated as poor.

TABLE 1

| | Percentage of specimens with 10,000 nm² or more | Maximum void area nm² | Percentage of void cross-sectional areas of 10,000 nm² or more | Average thickness of cathode catalyst layer [μm] | Power generation performance | | Durability |
|---|---|---|---|---|---|---|---|
| | | | | | Standard conditions | High humidity conditions | |
| Ex. 1 | 18% | 105,625 | 51% | 20 | Good | Good | Good |
| Ex. 2 | 16% | 102,405 | 50% | 18 | Good | Good | Good |
| Ex. 3 | 14% | 92,047 | 48% | 15 | Good | Good | Good |
| Ex. 4 | 19% | 108,052 | 52% | 25 | Good | Good | Good |
| Ex. 5 | 14% | 68,047 | 45% | 19 | Good | Good | Good |
| Comp. Ex. 1 | 10% | 43,782 | 36% | 11 | Good | Poor | Poor |
| Comp. Ex. 2 | 11% | 81,324 | 40% | 13 | Good | Poor | Poor |
| Comp. Ex. 3 | 22% | 114,152 | 58% | 40 | Poor | Poor | Good |

In Examples 1 to 5, the percentage of frequencies of a void cross-sectional area of 10,000 nm² or more was in the range of 13% or more and 20% or less.

In Example 3, the maximum value of the cross-sectional areas of the voids was 70,000 nm² or more and 100,000 nm² or less, and the percentage of the total cross-sectional area of the voids of 10,000 nm² or more with respect to the total void cross-sectional area (total cross-sectional area of all the voids) was 40% or more and 50% or less.

Consequently, in Examples 1 to 5, power generation performance was evaluated as good and durability was also evaluated as good, regardless of the conditions during measurements. Specifically, the membrane-electrode assemblies of Examples 1 to 5 were capable of forming fuel cells having good power generation performance and good durability.

In Comparative Examples 1 to 3 in which the percentage of frequencies of a void cross-sectional area of 10,000 nm² or more was not in the range of 13% or more and 20% or less, power generation performance was poor under either the standard conditions or the high humidity conditions. This is considered to be because a distribution of the void cross-sectional areas biased toward small areas might have deteriorated drainage and durability, or a distribution biased toward large areas might have deteriorated the performance due to a reduced number of active sites.

As a consequence, according to the present embodiment, high power generation performance can be exhibited, the occurrence of flooding can be reduced or prevented, and durability can be improved by using a membrane-electrode assembly which has a catalyst layer structure including at least a catalyst 21, carbon particles 22, a polymer electrolyte 23, and a fibrous material 24, and which has a histogram of void cross-sectional areas in which the percentage of frequencies of a void cross-sectional area of 10,000 $nm^2$ or more to the entire frequencies is 13% or more.

Specifically, in order to produce a catalyst layer for polymer electrolyte fuel cells, a membrane-electrode assembly, and a polymer electrolyte fuel cell, which achieve high output power by improving gas diffusion and which are capable of maintaining good performance for a longer period of time by achieving high drainage, the contents of the catalyst 21, the carbon particles 22, the polymer electrolyte 23, and the fibrous material 24 composing the catalyst layer may be optimized, or, as described in the present embodiment, the percentage of frequencies of a void cross-sectional area of 10,000 $nm^2$ or more may be considered and the range may be set to 13% or more and 20% or less.

INDUSTRIAL APPLICABILITY

According to the present embodiment, there can be provided a catalyst layer which achieves high output power by improving gas diffusion and is capable of maintaining good performance for a longer period of time by achieving high drainage, and there can also be provided a membrane-electrode assembly and a polymer electrolyte fuel cell using the catalyst layer. The present embodiment can also provide a cell unit or a fuel-cell stack including the catalyst layer for polymer electrolyte fuel cells or including the membrane-electrode assembly described above. In this way, the present embodiment can be suitably applied to stationary cogeneration systems, hybrid vehicles, and the like, which use polymer electrolyte fuel cells, and has high industrial availability.

REFERENCE SIGNS LIST

1 . . . Polymer electrolyte membrane; 2 . . . Anode catalyst layer (oxidation electrode or fuel electrode); 3 . . . Cathode catalyst layer (reduction electrode or air electrode); 4 . . . Gasket; 5 . . . Gas diffusion layer; 6 . . . Anode; 7 . . . Cathode; 8 . . . Gas channel; 9 . . . Cooling water channel; 10 . . . Separator; 11 . . . Polymer electrolyte fuel cell; 12 . . . Membrane-electrode assembly; 21 . . . Catalyst; 22 . . . Carbon particles; 23 . . . polymer electrolyte particles; 24 . . . Fibrous material; 25 . . . Void.

What is claimed is:

1. A catalyst layer for polymer electrolyte fuel cells, comprising:
    a catalyst, carbon particles, a fluorine polymer electrolyte, and a fibrous material, the carbon particles carrying the catalyst, wherein:
    the fibrous material has a fiber length of 0.1 μm or more and 200 μm or less and an average fiber diameter of 0.5 nm or more and 500 nm or less;
    the catalyst layer for polymer electrolyte fuel cells includes voids; and
    a percentage of frequencies of the voids having a cross-sectional area of 10,000 $nm^2$ or more is 13% or more and 20% or less among the voids observed in a thickness-direction cross section of the catalyst layer perpendicular to a surface thereof.

2. The catalyst layer of claim 1, wherein a maximum value of the cross-sectional areas of the voids is 70,000 $nm^2$ or more and 100,000 $nm^2$ or less.

3. The catalyst layer of claim 1, wherein a percentage of a total cross-sectional area of the voids having a cross-sectional area of 10,000 $nm^2$ or more among the voids with respect to a total cross-sectional area of all the voids is 40% or more and 50% or less.

4. The catalyst layer of claim 1, wherein the catalyst layer is configured to have an average thickness in a range of 1 μm or more and 30 μm or less in a direction perpendicular to the surface of the catalyst layer.

5. A membrane-electrode assembly, comprising:
    a polymer electrolyte membrane having surfaces respectively provided with an anode catalyst layer and a cathode catalyst layer;
    the anode catalyst layer and the cathode catalyst layer are each provided with a frame-shaped gasket; and
    at least one of the anode catalyst layer and the cathode catalyst layer is the catalyst layer for polymer electrolyte fuel cells of claim 1.

6. A polymer electrolyte fuel cell, comprising a polymer electrolyte fuel cell provided with the catalyst layer of claim 1.

7. A polymer electrolyte fuel cell, comprising a polymer electrolyte fuel cell provided with the membrane-electrode assembly of claim 5.

8. The catalyst layer of claim 1, wherein a mass ratio between the fluorine polymer electrolyte and the fibrous material is from 1:2 to 2:1.

9. The catalyst layer of claim 2, wherein a mass ratio between the fluorine polymer electrolyte and the fibrous material is from 1:2 to 2:1.

10. The catalyst layer of claim 3, wherein a mass ratio between the fluorine polymer electrolyte and the fibrous material is from 1:2 to 2:1.

11. The catalyst layer of claim 9, wherein a percentage of a total cross-sectional area of the voids having a cross-sectional area of 10,000 $nm^2$ or more among the voids with respect to a total cross-sectional area of all the voids is 40% or more and 50% or less.

* * * * *